May 5, 1936.  M. N. MIKULIC  2,039,547
ELECTRIC GENERATOR AND HEATING AND COOLING MEANS
Filed March 31, 1934
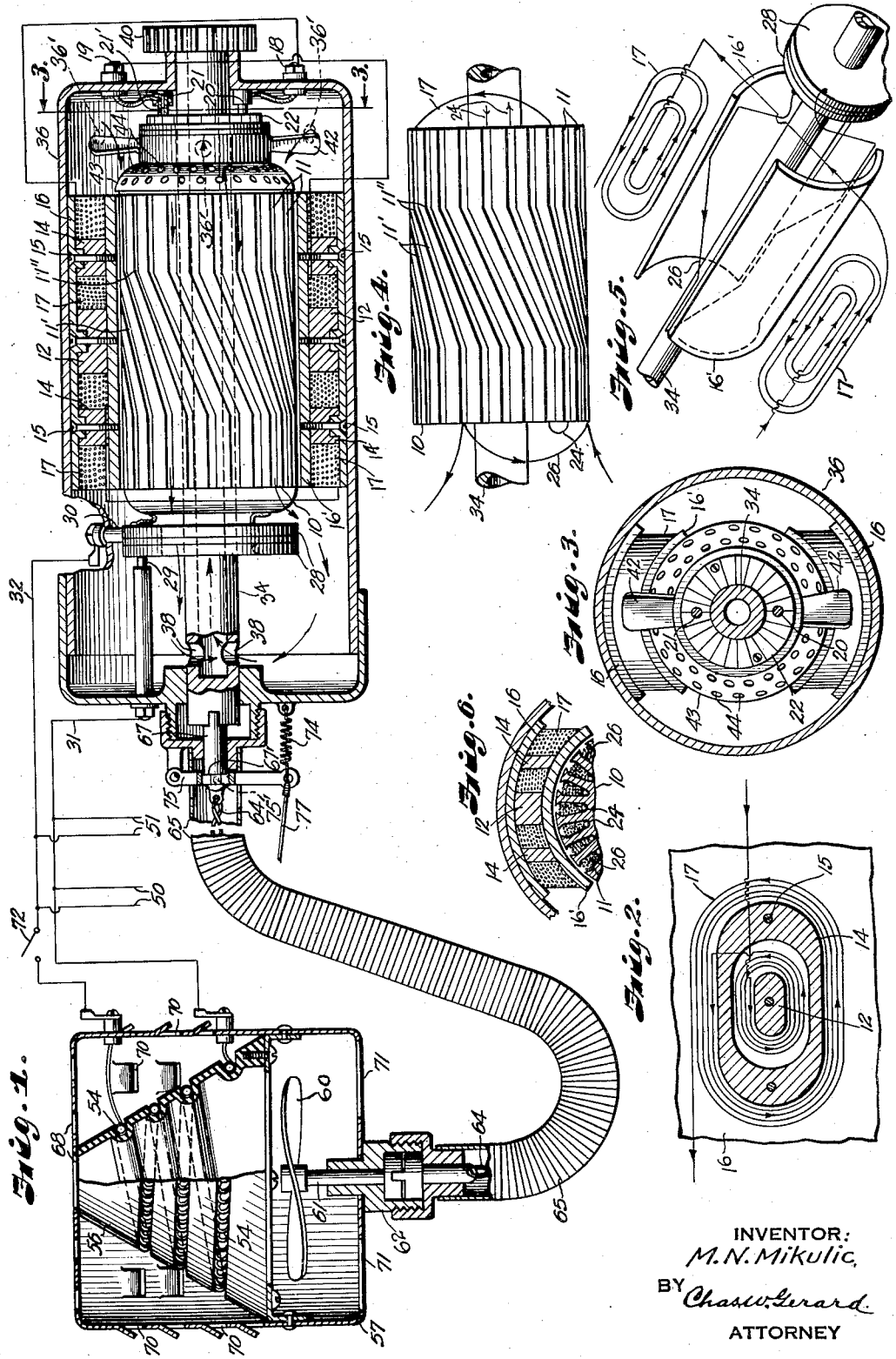
INVENTOR:
M. N. Mikulic,
BY Chas. W. Gerard
ATTORNEY Patented May 5, 1936

2,039,547

UNITED STATES PATENT OFFICE

2,039,547

ELECTRIC GENERATOR AND HEATING AND COOLING MEANS

Milos N. Mikulic, Independence, Mo., assignor of one-third to E. H. Munford and one-third to H. D. Pinkerton, both of Kansas City, Mo.

Application March 31, 1934, Serial No. 718,423

7 Claims. (Cl. 171—252)

The present invention relates to electric generating and heating or ventilating appliances, and aims to devise improvements both in the means for generating of alternating current and also in the appliances for using such current, such as for heating or ventilating purposes.

One of the primary objects in view is to devise an improved generator, as well as motor-generator, construction of the alternator type, in which a novel method and arrangement of both the armature and field windings is used, and other provision made for minimizing the heating effects produced by the operation of the construction for current-generating purposes.

In carrying the invention into practice, my aim is to provide a suitable generator unit adapted to provide a source of alternating current of moderate capacity for such uses as car lighting and heating, as well as ignition and radio operation,—although the same principles of construction are adaptable for larger capacities where desired.

As a special feature of the invention, its adaptability for car or auto use is found in its arrangement as a combined generator and heating and cooling or ventilating assembly, so connected and arranged as to produce either a heating or cooling and ventilating action, for the interior of the car or auto, and including a drive from the generator unit to a fan or impeller element arranged as a part of the heating or ventilating unit.

With the foregoing general objects in view, as well as minor features of improvement which will hereinafter appear, the invention will now be described by reference to the accompanying drawing illustrating certain forms of embodiment of the improvements, after which those features and combinations deemed to be novel and patentable will be particularly set forth and claimed.

In the drawing—

Figure 1 is a diagrammatic and sectional plan view of a construction embodying the present features of improvement;

Figure 2 is a sectional view representing the winding of one of the field magnets;

Figure 3 is a transverse sectional view, representing a section taken on the line 3—3 of Figure 1;

Figure 4 is a plan view of the armature member, with lines diagrammatically representing the scheme of wiring for both the primary and secondary windings of the armature;

Figure 5 is a diagrammatic perspective view illustrating the course of one of the armature coil windings with reference to the field and the coils of the field magnets; and Figure 6 is a fragmentary sectional view of the armature and one of the field magnets.

Referring to my improvements in the generator type of construction for producing alternating current, this comprises a rotating armature with a special arrangement of windings operating in the field between two field magnets, as represented in Figures 1 and 2, and 4 to 6. The primary feature of improvement as regards the armature is the provision of the rotor 10 with a plurality of longitudinal grooves or channels 11 having their intermediate portions 11' extending in inclined relation to their end portions, so that the straight ends of said grooves or channels are relatively staggered about the periphery of the rotor 10, as clearly indicated in Figures 1 and 4. This arrangement of the grooves or channels 11 bears a definite relationship to the poles of the field magnets, each of which is made of a split or divided pole type, comprising a central pole piece 12 and a ring pole element 14, secured by screws 15 to a base or anchor plate 16 and an inner curved shell 16', and having a common field wire 17 wound in the same direction about the pole elements of each magnet,—the course of field windings of the two field magnets being indicated in Figure 5, and the terminals of said wire 17 leading to binding posts 18, 19, connected to the brushes 20, 21, respectively, at opposite sides of the commutator ring 22 (see Figure 1). Preferably said brushes are formed with copper or brass cores 21'.

As will be seen by reference to Figure 1, the contour of the grooves or channels 11 is such that the length of the intermediate or inclined portions 11' is approximately that of the diameter of the ring pole elements 14, thus bringing the angles 11'' of the grooves into approximately transverse alinement with the opposite sides of said elements 14.

The armature winding comprises a series of single-turn coils 24, each traversing a pair of the grooves 11 and having its terminals connecting with appropriate opposite segments of the commutator ring 22 for supplying direct current to the field coils.

Also wound through the grooves or channels 11 is a plurality of multiple-coil windings 26, each winding traversing a pair of grooves spaced apart at intervals according to the cycle of current desired, and having its terminals connected with collecting rings 28, from which the alternating current thus generated is transmitted through brushes 29 and 30 to the exterior circuit conductors 31 and 32.

Regarding this improved generator construction it may be explained that in the usual armature winding for single phase operation, where the coils are carried in straight longitudinal paths throughout the length of the armature, there arises an unbalanced armature reaction which necessarily produces a considerable degree of flux variation at the tips of the pole pieces, and likewise to a more or less extent throughout the whole field structure. The present arrangement of winding, in which the intermediate portions of the coils of the armature are positioned at an inclination to the path of their movement through the field, eliminates this unbalanced effect to a very great extent, with the result that there is a more uniform action of the flux throughout the more intense zones of the field, and consequently a more even inductive action for producing and maintaining the current potential, as compared with the effects derived from the usual straight longitudinal windings, the full length of which cuts the lines of force at any given instant and therefore passes through zero phase at each half-cycle. By my improved winding, therefore, I seek to avoid a zero point as regards the cutting of the lines of force and the corresponding drop to zero of the E. M. F. or current-inducing pressure which characterizes the usual type of armature winding. This further tends to build up the full maximum pressure at the winding terminals, so that as nearly maximum current strength as possible is sought to be obtained by the armature's operation. This is in contrast to the usual performance in single-phase operation, involving the loss of certain so-called wattless components of pressure, with corresponding loss of energy in the current produced.

The armature is mounted on a hollow or tubular shaft 34 journaled in a frame or housing 36, one end of which shaft is provided with lateral openings 38, and its other end having a driving element, such as a gear 40 (outside the housing 36) to which a drive connection may be made, as, e. g., from the power plant of an automobile or the like. For circulation of air around the armature, for cooling purposes, a fan or impeller member 42 and shell 43 having suitable perforations 44, are secured to the shaft 34 between the commutator 22 and the armature, whereby a flow of air is produced, starting with the impeller member at the right end of the housing 36 in Fig. 4, and moving around and through the channels 11 of the armature to the opposite end of the housing 36, and thence back through the shaft 34 (by way of the openings 38) to atmosphere at the opposite open end of said shaft 34, all as indicated by the arrows representing the course of said air flow, as shown in Fig. 4.

Thus the efficiency of the improved generator construction is further promoted by the cooling action of the air currents produced by the fan or impeller 42, and the housing and armature shaft construction for utilizing such currents, whereby any tendency toward a rise in temperature during the armature's operation is effectively opposed, and a proper operating temperature thus maintained.

The current thus produced by operation of the generator may be utilized in various ways by tapping the conductors 31, 32; as, for example, in automobile installations for which the improvements are especially adapted, by means of circuit wiring 50 for the lighting system, and wiring 51 for radio operation; while for heating purposes the conductors 31, 32, may be connected with a heater coil 54 mounted on a conical shell 56 enclosed within a housing 57 which may be attached in any suitable location within the car or automobile.

Opposite the larger end of the conical shell 56 is mounted a fan or impeller member 60 on the end of a shaft 61 journaled in a bearing 62 at the corresponding end of the housing 57,—said shaft being operatively connected with a flexible drive cable 64 extending through a flexible tubing 66 and provided with a clutch connection 67 with one end of the armature shaft 34. The other end of the housing 57 is provided with suitable air outlet openings 68, while the sides of the housing are also formed with louver openings 70 for admitting air as its flow is induced by the action of the impeller pulling air through the housing openings 71 (behind the impeller) and forcing it through the shell 56 and thence out through the central opening 68. A switch 72 is provided for turning on or off the current through the heater coil; and when the current is off the fan or impeller may be operated independently of the heater for ventilating and cooling purposes only. The clutch 67 is held normally closed by a coil spring 74 engaging a lever 75 connected with the clutch by means of lugs or pins 75' carried by a yoke portion of said lever and received within a suitable channel 67' formed in the outer end of the clutch member. The lever 75 may be retracted for disconnecting the clutch by means of a suitable operating connection 77 leading into any desired position convenient for its operation within the car.

It will therefore be apparent from the foregoing that I have provided a novel and practical arrangement and construction for carrying out the several desired objects of the invention, and that the same may, for example, be installed in the place of the usual generator equipment furnished with automobiles, for not only supplying the regular current as in present practice, but also an ample current supply for radio operation and heating purposes, as well as for independent cooling or ventilating operation to suit requirements, as above explained.

It may also be pointed out that the improved construction effects an economy in the materials used, on account of the method of winding being such as to render it most effective in its operation by virtue of its continuous and more nearly uniform rate of action as it travels across the field between the poles.

Furthermore, the current generated by the alternator unit may, by appropriate design of proportions and other details, for varying its capacity, be obviously adapted for practically any duty for which such equipment may be used. Therefore, while I have illustrated and described a practical and efficient form of embodiment of my improvements, suitable for the proposed uses, I desire to be understood as expressly reserving the right to make what ever changes or modifications may fairly fall within the spirit and scope of the appended claims.

Having thus described my invention, what I claim as new and desire to secure by Letters-Patent, is:

1. In a generator construction, an armature having the intermediate portions of its peripheral windings extending at an angle with reference to the path of movement of the windings through the field and a divided pole structure comprising field coils wound about a central pole piece and a ring pole element approximately coextensive with said intermediate angular portions of the armature windings.

2. In a generator construction, an armature having both primary and secondary windings provided with oppositely arranged terminals, and a divided pole structure comprising field coils provided with connections to the terminals of said primary windings and wound about a central pole piece and a ring pole element surrounding said central pole piece.

3. In a generator for alternating current, an armature having both primary and secondary windings provided with oppositely arranged collecting terminals adapted for transmitting direct and alternating current respectively, and a divided pole structure comprising field coils provided with connections to said direct current terminals and wound about a central pole piece and a ring pole element surrounding said central pole piece.

4. In a generator for alternating current, an armature having both primary and secondary windings each extending at an angle with reference to its path of movement through the field and provided with oppositely arranged collecting terminals adapted for transmitting direct and alternating current respectively, and a divided pole structure comprising field coils provided with connections to said direct current terminals and wound about a central pole piece and a ring pole element surrounding said central pole piece.

5. In a generator for alternating current, an armature having both primary and secondary windings having their peripheral portions arranged partly in angular relation with reference to their path of movement through the field and provided with oppositely arranged collecting terminals adapted for transmitting direct and alternating current respectively, and a divided pole structure comprising field coils provided with connections to said direct current terminals and wound about a central piece and a ring element surrounding said central pole piece, said ring element being approximately coextensive with the angular portions of said armature windings.

6. In a generator construction, an armature having the intermediate portions of the windings thereon extending through the field at an angle with reference to the path of movement of the windings through the field and the remaining portions of said windings extending parallel to the axis of the armature, and oppositely positioned pole structures each comprising field coils wound about a central pole piece and a ring element surrounding said central pole piece, said ring elements being each approximately coextensive with the angular portions of said armature windings.

7. In a generator construction, an armature mounted on a tubular shaft provided with air intake openings at one end, an impeller member carried by the other end of said shaft, a perforated shell intermediate said impeller and adjacent end of the armature for distributing the flow of air as generated by said impeller evenly around the armature, and a housing confining the airflow around the said parts and directing its return into said openings and through the shaft.

MILOS N. MIKULIC.